United States Patent
He et al.

(10) Patent No.: US 7,249,723 B2
(45) Date of Patent: Jul. 31, 2007

(54) ORGANIC SOLVENT DISPERSED NANO-TALC SLURRY

(75) Inventors: Jianhong He, Irwin, PA (US); Qiping Zhong, Cupertino, CA (US); Srikanth Raghunathan, Irwin, PA (US)

(73) Assignee: NGX, Inc., Phoenixville, PA (US)

(*) Notice: Subject to any disclaimer, the term of this patent is extended or adjusted under 35 U.S.C. 154(b) by 0 days.

(21) Appl. No.: 11/018,946

(22) Filed: Dec. 21, 2004

(65) Prior Publication Data

US 2006/0086837 A1 Apr. 27, 2006

Related U.S. Application Data

(63) Continuation-in-part of application No. 10/890,852, filed on Jul. 14, 2004.

(51) Int. Cl.
*B02C 19/00* (2006.01)

(52) U.S. Cl. .................. 241/21; 241/29; 977/888; 977/900

(58) Field of Classification Search ........... 241/21, 241/29; 977/840, 888, 900
See application file for complete search history.

(56) References Cited

U.S. PATENT DOCUMENTS

| | | | | |
|---|---|---|---|---|
| 4,176,137 A | * | 11/1979 | Platz et al. | 502/234 |
| 4,391,733 A | * | 7/1983 | Lamar et al. | 252/378 R |
| 6,936,236 B2 | * | 8/2005 | Yamamoto et al. | 423/625 |

* cited by examiner

*Primary Examiner*—Mark Rosenbaum
(74) *Attorney, Agent, or Firm*—Debra M. Parrish

(57) ABSTRACT

The invention provides high surface area talc compositions by a novel hybrid milling method or soaking method. The hybrid milling method comprises dry milling talc powder followed by mixing with water and wet milling to provide a nano-talc slurry with high surface area, also of the invention. The soaking method comprises dry milling talc powder followed by mixing with water and soaking to provide high surface area nano-talc slurry. The slurry may be dewatered and dried to provide dry nano-talc powder. The nano-talc powder provided by the invention is a novel hydrophilic talc composition. Further embodiments of the invention include organic solvent dispersed nano-talc slurries and methods for providing the same. These slurries can be used to provide polymer nano-talc composites in the form of coatings, sealing and gasketing materials, foams, extruded thermoplastic and thermoset sheets and films, thermoplastic pellets, thermoplastic and thermoset molded polymer composite articles. Another embodiment is a polyurethane nano-talc composite article derived from the organic solvent dispersed slurries.

9 Claims, 4 Drawing Sheets

ORGANIC SOLVENT DISPERSED NANO-TALC SLURRY

CROSS REFERENCE TO RELATED APPLICATION

This application is a continuation-in-part of application Ser. No. 10/890,852 filed Jul. 14, 2004, currently pending, which is incorporated herein by reference.

This invention was made with United States Government support under Agreement No. W911NF-04-2-0025 awarded by U.S. Army. The United States Government has certain rights in the invention.

BACKGROUND OF INVENTION

1. Field of Invention

The invention relates to new methods for the comminution of minerals to sub-micron particle sizes that are especially relevant to the processing of talc powders.

2. Description of Related Art

It is a well-known process to grind minerals in a ball mill in order to reduce the size of particles. This process, however, does not provide the ability to reduce the particle size of the majority of the particles below 2 microns equivalent spherical diameter. In order to produce particles with desirable properties, smaller particles are needed. In a modification to the traditional ball mill grinding method, U.S. Pat. No. 3,604,634 teaches a grinding method wherein an aqueous solution of at least 25 percent by weight of calcium carbonate is ground with a particulate grinding material long enough to dissipate at least 250 horsepower hours of energy per ton. According to the patent disclosure, sixteen hours of grinding using that process yielded a finished product with 97% of the particles smaller than 2 microns and 32% of the finished particles smaller than 500 nanometers.

Due to problems with spontaneous crystal dissolution-recrystallization in situations where the aqueous solution was overly saturated, U.S. Pat. No. 4,265,406 taught the addition of additives to the solution in order to reduce the particle size and thus increase the relative surface area of the powder.

In U.S. Pat. No. 4,325,514 ("the '514 patent"), comminution is referenced that can be performed either "wet or dry". The method of comminution is via ball-milling. That specification, however, actually teaches away from the instant invention by noting that the preferred grinding method is an aqueous slurry as opposed to a dry mixture. The '514 patent claims a method of comminuting materials involving a rotating impeller being forced through an aqueous slurry containing the subject material in solution.

Various inventive steps have subsequently made upon the basic slurry grinding model; however, the focus was on dispersing the particles for better grinding on centrifuging them in order to obtain uniformity in size. See, for example, U.S. Pat. No. 4,793,985 to Price, et al. and U.S. Pat. No. 4,845,191 to Hautier.

Virtually all of the aforementioned slurry grinding methods have the disadvantages of a large number of steps, complicated equipment and/or addition of additives. We have found a novel method for comminuting minerals to very small particle size that is especially useful in the comminution of talc powders.

In further embodiments of the invention we have developed organic solvent dispersed nano-talc slurries. These slurries can be used to provide polymer nano-talc composites in the form of coatings, sealing and gasketing materials, foams, extruded thermoplastic and thermoset sheets and films, thermoplastic pellets, thermoplastic and thermoset molded polymer composite articles.

SUMMARY OF INVENTION

In one embodiment the invention is a method of providing an aqueous nano-talc slurry with a specific surface area of 70 $m^2/g$ to about 500 $m^2/g$ comprising dry milling talc powder for a period of time to provide a talc powder with specific surface area of about 40 $m^2/g$ to about 130 $m^2/g$; mixing the talc powder with a specific surface area of about 40 $m^2/g$ to about 130 $m^2/g$ with about 2 to about 20 parts water to provide a talc slurry, and soaking for a period of time, or, wet milling for a period of time, to provide an aqueous nano-talc slurry with specific surface area of about 70 $m^2/g$ to about 500 $m^2/g$.

A further embodiment of the invention is a method of providing a flowable organic solvent dispersed nano-talc slurry with a specific surface area of 70 $m^2/g$ to about 200 $m^2/g$ comprising: dry milling talc powder for a period of time to provide a dry-milled nano-talc powder with specific surface area of about 40 $m^2/g$ to about 130 $m^2/g$; mixing the dry-milled nano-talc powder with an amount of organic solvent to provide a nano-talc-solvent mix; and wet milling said nano-talc-solvent mix for a period of time, to provide a flowable organic solvent dispersed nano-talc slurry characterized by a specific surface area of about 70 $m^2/g$ to about 200 $m^2/g$.

Another embodiment of the invention is an organic solvent dispersed nano-talc slurry characterized by an average nano-talc platelet diameter of about 80 to 200 nm as determined by transmission electron microscopy, comprising: (a) 1 to 30 wt % nano-talc powder characterized by a specific surface area of 70 $m^2/g$ to about 200 $m^2/g$; and (b) 70 to 99 wt % of an organic solvent; wherein said organic solvent is miscible with at least one organic solvent selected from the group ethyl acetate, toluene and 1,2-dichloroethane.

Another embodiment of the invention is a polyurethane nano-talc composite article, characterized by an average nano-talc platelet diameter of about 80 to 200 nm and comprising the cured reaction product of: (A) an organic solvent dispersed nano-talc slurry comprised of (a) 1 to 30 wt % nano-talc powder having a surface area of 70 $m^2/g$ to about 200 $m^2/g$; and (b) 70 to 99 wt % of an organic solvent; wherein said organic solvent is miscible with at least one organic solvent selected from the group ethyl acetate, toluene and 1,2-dichloroethane; and (B) an isocyanate terminated polyurethane prepolymer; and, optionally, (C) a polyol with a number average molecular weight of 100 to 10,000.

DETAILED DESCRIPTION OF INVENTION

Figure 1:
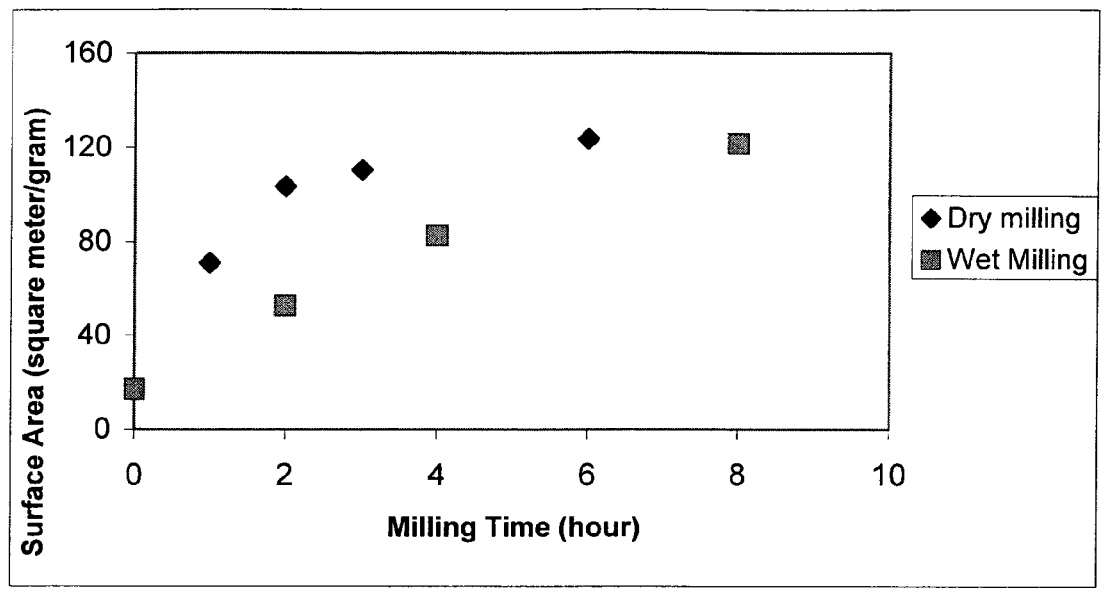
FIG. 1 illustrates the surface area of talc as a function of milling time for conventional one step process of dry milling or wet milling that acts as a control.

Talc is a naturally occurring mineral, a layered hydrous magnesium silicate of general empirical formula $Mg_3Si_4O_{10}(OH)_2$, that is broken up and usually ground to a fine powder. Talc is a white, apple green, gray powder with luster pearly or greasy with a Mohs hardness of 1-1.5. It has a high resistance to acids, alkalies and heat. The hydroxy groups normally are internal to the magnesium layer and are not accessible to water except at the edges of the silicate sheet. Thus, conventional talc powder is a hydrophobic material that easily blends and disperses with organic media including polymers but is not easily dispersed in aqueous solvents. The talc powder used in the milling process of the invention may be any commercial talc derived from natural sources. The talc initial particle size is not of great importance, but preferably the initial median particle size is about 0.5 μm to about 10 μm and a specific surface area (SSA) of about 5 $m^2/g$ to about 20 $m^2/g$. Commercial samples of such a talc powder are the Luzenac America's NICRON® 674 (SSA 14 $m^2/g$), CIMPACT® 710 (SSA 14 $m^2/g$) and Specialty Minerals Inc. UltraTalc™ 609 (SSA 17 $m^2/g$).

Throughout the specification reference is made to the specific surface area (SSA) of the mineral powder. The SSA number corresponds to that derived from the BET surface area measurement that is described in J. Am. Chem. Soc., 60, 309 (1938) by Brunauer, Emmett and Teller. There are well known commercial instruments available that are used to measure the SSA using nitrogen as the gas absorbed. The SSA is used to monitor the progress of the dry milling and wet milling or soaking of the mineral powder.

Mechanical milling may be accomplished with any mill that provides high intensity, high energy pounding or grinding such as a vibratory mill, planetary mill, uniball mill or high energy ball mill. Alternative equipment e.g. hammer mill, sand milling, jet mill (steam or air), air classified mill (ACM) plus combination of milling and classification equipment may be used to provide a talc powder with a SSA of about 40 $m^2/g$ to about 130 $m^2/g$. Preferred mills for the process are Attritor mills that have a plurality of small solid balls as the grinding media, about 0.2 mm to about 10 mm in diameter, and preferably about 3 mm to about 6 mm. The media may be steel or ceramic balls. Preferably the media is selected from the group of carbon steel, stainless steel, tungsten carbide, ceria stabilized zirconia oxide, zirconia silicate, alumina and yttria-stabilized zirconia balls. The ball to powder ratio and the speed of the mill are two important parameters that determine the energy delivered to the powder in the milling process. Preferably about a 10:1 to about 30:1 weight ratio of ball to powder is used and most preferably about a 20:1 ratio is used. The mill is generally run at about 100 to about 500 rpms.

The methods of the invention require in the first step a mechanical milling of the mineral in the dry state. That is, the milling is conducted without liquid vehicles such as water, liquid nitrogen or organic solvents, or other media often used in grinding. The first stage milling, hereafter referred to as "dry milling," is preferably done in air for a period of time necessary to provide a powder with an SSA of about 40 $m^2/g$ to about 130 $m^2/g$. This is usually accomplished in about 1 to 12 hours depending upon the SSA of the starting material and the milling conditions such as the energy input (KW/hour per unit material) In the second step of the method of the invention the material is mixed with water to form a talc slurry. Any mixing method may be used. Water may be added to the mill and mixed gently to provide a uniform slurry or dry talc may be transferred to a separate mixing apparatus and mixed under a low shear environment to provide a uniform talc slurry. The water may be untreated tap water or de-ionized water, distilled water, softened water, or the like, but de-ionized water is preferred. The water may be at any temperature between freezing and boiling and water between about 10° C. and about 30° C. is preferred. The water may be slightly acidic or slightly basic with no detriment to the product or process. Preferred is water with a pH between about 3 and about 11 and more preferred is a pH of about 4 to about 10, and most preferred is pH about 5 to 10.

In one embodiment of the method of the invention, in the third step the aqueous talc slurry is wet milled for a period of time to provide an aqueous nano-talc slurry with an SSA between 70 $m^2/g$ to about 500 $m^2/g$. The time and temperature of wet milling may vary depending upon the surface area of the talc desired. This method of dry milling followed by wet milling with water is hereafter referred to as the hybrid milling method. The attributes of the hybrid milling method, compared with conventional dry milling or wet milling process are revealed in considering the data displayed in FIG. 1 thru FIG. 4.

FIG. 1 plots the surface area of a talc as a function of milling time for a one step process of dry milling or wet milling that acts as a control. Under dry milling conditions the SSA of talc rises rapidly to a plateau of about 125 $m^2/g$ after 6 h. Under wet milling with water the SSA of talc rises gradually and reaches about 125 $m^2/g$ after 8 h.

Figure 2:
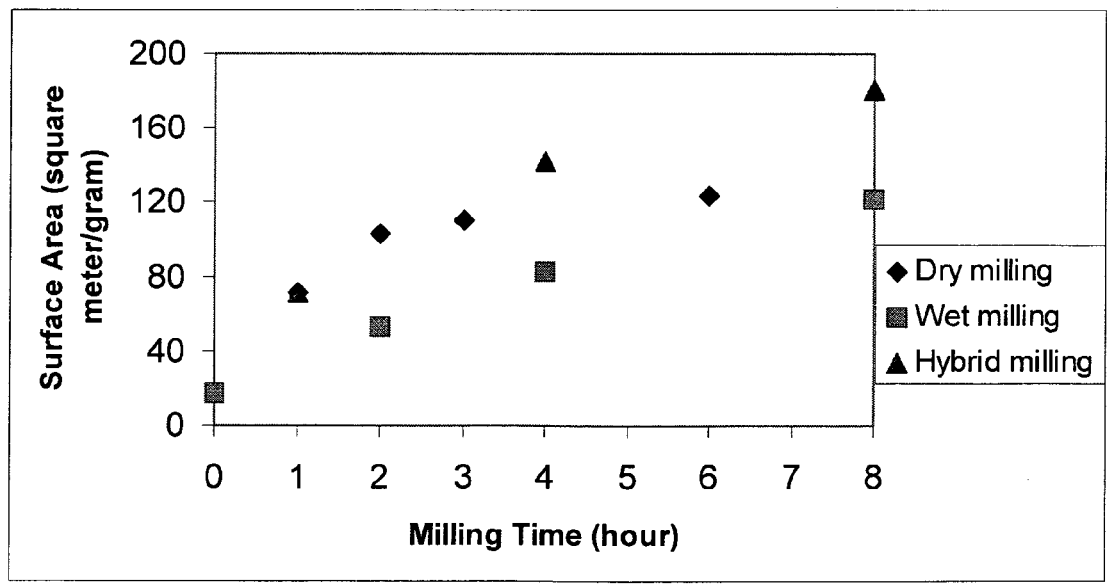
FIG. 2 compares the conventional dry and wet milling processes with the novel hybrid process of the invention wherein the talc is first dry milled for 1 hour.

FIG. 2 compares the conventional dry and wet milling process with a hybrid process of the invention wherein the talc is dry milled for 1 hour followed by wet milling for 3 and 7 h, respectively. The talc surface reaches 141.5 $m^2/g$ and 180.5 $m^2/g$ after 3 and 7 h wet milling, respectively.

Figure 3:
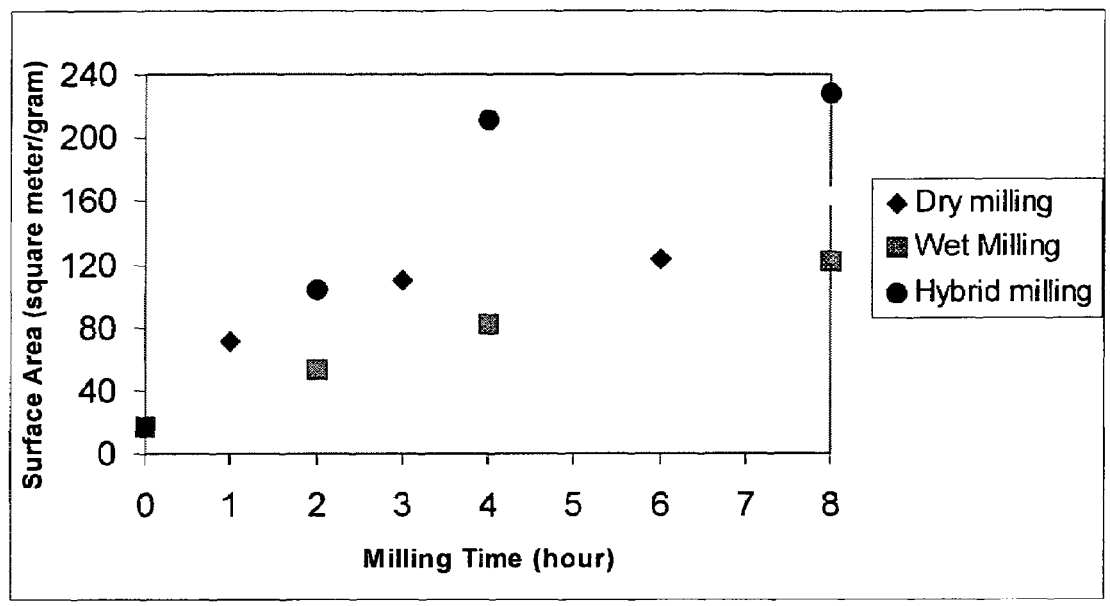
FIG. 3 compares the conventional dry and wet milling processes with a hybrid process of the invention wherein the talc is first dry milled for 2 hours.

FIG. 3 compares the conventional dry and wet milling process with a hybrid process of the invention wherein the talc is dry milled for 2 hours followed by wet milling for 2 and 6 h, respectively. The talc surface reaches 210.6 $m^2/g$ and 228.1 $m^2/g$ after 2 and 6 h wet milling, respectively.

Figure 4:
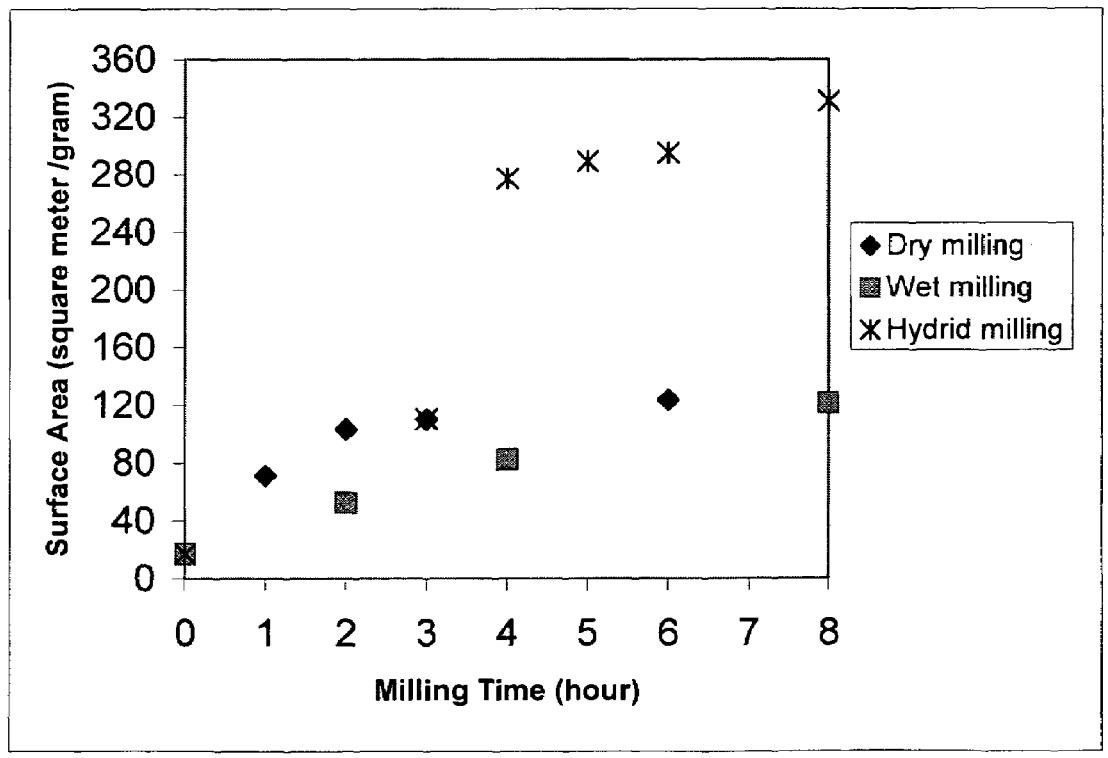
FIG. 4 compares the conventional dry and wet milling processes with a hybrid process of the invention wherein the talc is first dry milled for 3 hours.

FIG. 4 compares the conventional dry and wet milling process with a hybrid process of the invention wherein the talc is dry milled for 3 hours followed by wet milling for 1, 2, 3 and 5 h, respectively. The talc surface reaches 277.1 $m^2/g$ and 331 $m^2/g$ after 1 and 5 h wet milling, respectively. From these comparisons it is clear that the hybrid milling leads to significant increases in SSA of the talc slurry.

Figure 5:
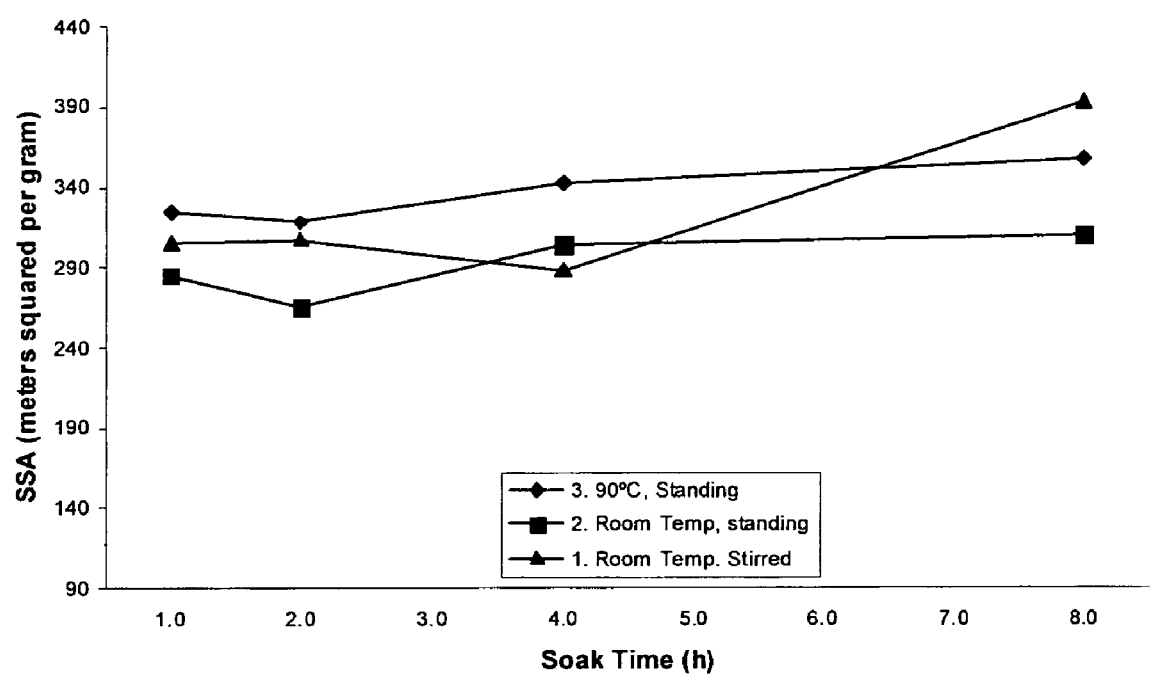
FIG. 5 illustrates the surface area of talc provided by the soaking method wherein the talc is first dry milled for 2.5 hours.

In another embodiment of the invention, in the third step the aqueous talc slurry is allowed to soak for a period of time to provide an aqueous nano-talc slurry with an SSA between 70 $m^2/g$ to about 500 $m^2/g$. The time and temperature of soaking may vary depending upon the surface area of the talc desired. Preferably soaking is done with some form of agitation such as stirring. This method of dry milling followed by soaking with water is hereafter referred to as the soaking method. The attributes of the soaking method are revealed in considering the data displayed in FIG. 5 wherein the talc is first dry milled for 2.5 hours.

In a further process step of the invention the aqueous nano-talc slurry from the hybrid milling or soaking method may be dried to give a dry flowable powder consisting essentially of about 99 to 99.5% talc. Any conventional drying method or series of methods may be used to provide the dry talc powder. For instance, a 100% thermal drying may be used or preferably a combination of mechanical dewatering followed by thermal dewatering may be used.

Dewatering methods useful in serial drying include decantation, membrane filtration and centrifugal decantation. Drying methods that may be applied include flash drying, tray drying, spray drying, freeze drying, and fluidized bed drying. The drying may be carried out under ambient conditions or under vacuum. However, preferably the talc suspension, after mechanical dewatering, is dried in a two-step process wherein the first step rapidly removes the bulk of the moisture and the second step, over a longer residence time, removes the remaining moisture. For instance, a flash mill dryer, e.g. a Hosokowa Long Gap Mill, may be used to reduce the moisture content from about 50 wt % to about 5 wt %. The material is then transferred to a long residence time dryer that may reduce the moisture content of the nano-talc powder to about 0.5 wt %.

Other talc milling processes may achieve high surface areas comparable to those achieved with the hybrid milling process of the invention. For instance, talc may be milled in the presence of 1 to 16 parts of salt as a milling media to give a powder with a SSA of about 250 m$^2$/g as described in the parent application Ser. No. 10/175976. However, the salt has to be removed by washing the talc with copious amounts of water that is an expensive and time-consuming process.

There is significant change in the attributes of talc upon treatment with the hybrid milling method. The aqueous talc slurry provided by the hybrid milling process does not settle to give a supernatant liquid, but rather remains a mud-like suspension for months. Gentle stirring results in shear thinning and breaks the suspension into an easily flowable liquid. Talc suspensions derived from the dry milling process, in comparison, settle into a supernatant water layer and a heavier talc fraction within a few minutes. Talc slurry from the soaking process settles within a few hours.

Figure 6:
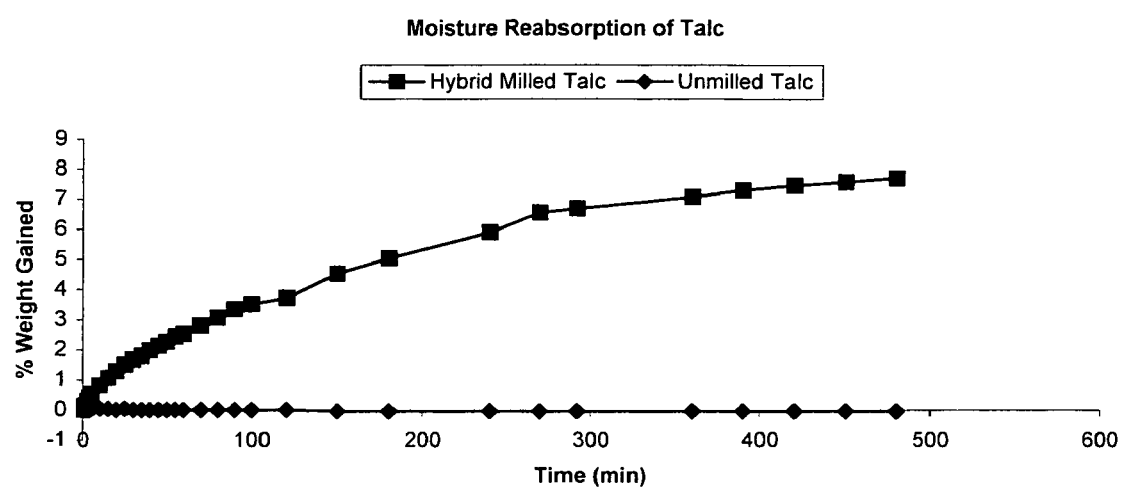
FIG. 6 compares the moisture uptake of conventional talc and the hydrophilic talc of the invention.

Talc usually has very little moisture associated with it. Dry milling of talc provides a product that has about 0.5 wt % water. The hydrophilic talc derived from the hybrid milling or soaking method absorbs about 5 wt % to about 15 wt % water over a period of twelve hours standing in air. FIG. 6 compares the moisture uptake of conventional talc and the hydrophilic talc of the invention.

The hybrid milling method and soaking method provide a hydrophilic talc powder. As described earlier, talc is usually considered a hydrophobic mineral that disperses readily in organic solvents or polymers. However, the talc powder derived from hybrid milling disperses only marginally in organic solvents and very readily in water. Conventional dry milling of talc provides a material with the hydrophobic properties of conventional talc.

Another embodiment of the invention is a method of providing a flowable organic solvent dispersed nano-talc slurry with a specific surface area of 70 m$^2$/g to about 200 m$^2$/g. The method comprises the first step of mechanical milling of talc in the dry state as mentioned above. Preferably the milling is conducted for 2 to about 6 hours to provide a dry-milled nano-talc powder with specific surface area of about 40 m$^2$/g to about 130 m$^2$/g. In a second step, the dry-milled nano-talc powder is mixed with an amount of organic solvent to provide a nano-talc-solvent mix. Preferably, about 2 to 10 parts, by weight, of the solvent are used to form the mix and, more preferably, about 3 to about 6 parts are used in the mix. In a third step the nano-talc-solvent mix is wet milled, preferably from 10 minutes to about 4 hours, to provide a flowable organic solvent dispersed nano-talc slurry characterized by specific surface area of about 70 m$^2$/g to about 200 m$^2$/g. Preferably, the nano-talc slurry is characterized by a specific surface area of about 100 to about 160 m$^2$/g. The nano-talc slurry is further characterized by an average platelet diameter of about 80 to 200 nm as determined by transmission electron microscopy (TEM).

"Organic solvent dispersed" means that the dispersing solvent medium is miscible with typical organic solvents. Representative of typical organic solvents are ethyl acetate, toluene, and 1,2-dichloroethane. The dispersing solvent medium can be a single solvent or a mixture of two or more solvents and may include some fraction of water, if so desired, so long as the medium is miscible with typical organic solvents. The dispersing solvent medium is considered miscible if one part of solvent medium and one part typical organic solvent remain miscible upon mixing. The terms "dispersing solvent medium," "organic solvent" and "solvent" in the specification and claims have equivalent meaning.

The solvent preferably comprises materials with boiling points higher than 60° C. and may include one or more of the following groups of solvents: aliphatic, aromatic and alicyclic alcohols and polyols; aliphatic, aromatic and alicyclic ketones; aliphatic, aromatic, alicyclic and cyclic esters, carbonates and ethers and polyethers; aliphatic aromatic and alicyclic hydrocarbons; aliphatic acids; aliphatic amides and lactams; halogenated hydrocarbons and halogenated aromatic hydrocarbons; aliphatic and cyclic sulfoxides and sulfones, aliphatic and alicyclic amines, aliphatic and aromatic nitro compounds, aliphatic and aromatic nitriles, and heteroaromatic compounds.

Aliphatic, aromatic and alicyclic alcohols useful as a solvent dispersing medium can be mono-alcohols, diols, triols, and polyols, preferably with a molecular weight of about 40 to about 2000. Specific alcohols useful as a solvent include methanol, ethanol, 1-propanol, 2-propanol, sec-butyl alcohol, t-butyl alcohol, 1-pentanol, 1-hexanol, 2-hexanol, 1-octanol, 2-octanol, 1-decanol, 1-dodecanol, 1-hexadecanol, allyl alcohol, propargyl alcohol, cyclopentanol, cyclohexanol, phenol, p-chlorophenol, p-methyl phenol, ethylene glycol, diethylene glycol, triethylene glycol, tetraethylene glycol, propylene glycol, dipropylene glycol, tripropylene glycol, glycerol, trimethylol propane, 1,3-propane diol, 1,4-butanediol, 1,6-hexanediol, butane-1,3-diol, butane-2,3-diol, pentane-1,5-diol, 2,2-dimethyl-1,3-propanediol, 1,4-dihydroxycyclohexane, 1,4-dimethylol cyclohexane, octane-1,8-diol, decane-1,10-diol, dodecane-1,12-diol and higher-molecular weight compounds from the classes of polyester, polyester amide, polycarbonate, polyacetal and polyether polyols with a number average molecular weight of at least 200, preferably 500 to about 2000. Especially preferred alcohols for the invention are alcohols selected from the group: 2-propanol, 1-butanol, 2-butanol, ethylene glycol, diethylene glycol, 1,4-butane diol, 1,4 hexane diol, 1,2-propane diol, 1,3 propane diol, and mixtures thereof.

Aliphatic, aromatic and alicyclic ketones useful as a dispersing solvent medium include: acetone, methyl ethyl ketone (MEK), 2-pentanone, 4-hydroxy-4-methyl-2-pentanone, methyl isobutyl ketone, methyl t-butyl ketone, cyclopentnaone, cyclohexanone, cycloheptanone, cyclooctanone, 2-methylcyclohexanone, acetophenone, p-chloroacetophenone, and isophorone.

Aliphatic, aromatic, alicyclic and cyclic esters useful as a solvent dispersing medium include acetates, acrylates, methacrylates, and phthalates of mono-alcohols, diols, and polyols. Examples of appropriate esters include: methyl acetate, ethyl acetate, propyl acetate, n-butyl acetate, vinyl acetate, vinyl propionate, vinyl trimethoxysilane, allyl acetate, allyl acrylate, allyl methacrylate, progargyl acetate, progargyl acrylate, progargyl methacrylate, isopropenyl acetate, isopropenyl acrylate, isopropenyl methacrylate, methyl acrylate, ethyl acrylate, n-propyl acrylate, n-butyl acrylate, 2-hexyloxy acrylate, methyl methacrylate, ethyl methacrylate, n-propyl methacrylate, n-butyl methacrylate, 2-hexyloxy methacrylate, methyl benzoate, ethyl benzoate, dimethyl phthalate, diethyl phthalate, dibutyl phthalate, bis(2-hexyloxy) phthalate, dioctyl phthalate, diallyl phthalate, ethylene glycol diacetate, ethylene glycol diacrylate, ethylene glycol dimethacrylate, propylene glycol diacetate, propylene glycol diacrylate, propylene glycol dimethacrylate, 1,4-butanediol diacrylate, 1,4 butanediol dimethacrylate, 1,6-hexanediol diacrylate, 1,6 hexanediol dimethacrylate, and higher-molecular weight compounds from the classes of polyester, polyethylene glycol and polypropylene glycol polyols end-capped with one or two acetate, acrylate or methacylate groups and having a number average molecular weight of at least 200, preferably 500 to about 2000. Reactive polymerizable compounds with one or more hydroxyl groups are useful as solvents, for instance, 2-hydroxyethyl acrylate, 2-hydroxyethyl methacylate, 6-hydroxyhexyl acrylate, and 6-hydroxyhexyl methacylate. Cyclic esters useful as a solvent include γ-butyrolactone, ε-caprolactone, and caprolactone 2-(methacryloyloxy)ethyl ester.

Aliphatic, aromatic, alicyclic and cyclic carbonates useful as a solvent include: ethylene carbonate, propylene carbonate, dimethyl carbonate and diethyl carbonate.

Aliphatic, aromatic, alicyclic and cyclic ethers and polyethers useful as a solvent preferably have a molecular weight of about 70 to about 2000 and include: tetrahydrofuran, dioxane, methyl t-butyl ether, butyl ether, butyl glycidyl ether, t-butyl glycidyl ether, anisole, ethylene glycol dimethyl ether, 2-methoxyethanol, 2-ethoxyethanol, 2-propoxyethanol, 2-butoxyethanol, 2-phenoxyethanol, ethylene glycol divinyl ether, ethylene glycol diglycidyl ether, ethylene glycol monoglycidyl ether, propylene glycol methyl ether, propylene glycol dimethyl ether, propylene glycol ethyl ether, propylene glycol propyl ether, propylene glycol butyl ether, propylene glycol phenyl ether; and higher-molecular weight compounds from the classes of polyethylene glycols and polypropylene glycols, optionally, capped with one or two lower alkyl groups having a number average molecular weight of at least 120, preferably 150 to about 2000, wherein the lower alkyl group is a $C_1$-$C_6$ alkyl group. More preferred ether solvents for the invention include: 2-ethoxyethanol, 2-butoxyethanol, di(ethylene glycol)methyl ether, di(ethylene glycol)ethyl ether, di(ethylene glycol)butyl ether and di(ethylene glycol)dibutyl ether, and di(propylene glycol) methyl ether.

If so desired, mixtures of the earlier described alcohols and above described ethers can be used as solvents in the invention. Especially useful are mixtures of the above described preferred alcohols, preferred ethers and mixtures thereof.

Aliphatic acids useful as a solvent include: formic, acetic, propionic, acrylic and methacrylic acid.

Aliphatic, aromatic and alicyclic hydrocarbons useful as a solvent preferably have boiling points greater than 60° C. and include: $C_6$-$C_{16}$ saturated and unsaturated straight chain, branched chain and cyclic hydrocarbons; tetralin, toluene, o-, m-, and p-xylene, mesitylene, ethylbenzene, styrene, α-methylstyrene, and divinyl benzene. Preferred hydrocarbons are the xylene isomers, mesitylene, ethylbenzene, toluene, and mixtures thereof.

Aliphatic amides and lactams useful as solvents include: N,N-dimethylforamide, N,N-dimethyl acetamide, acrylamide, N,N-dimethylacrylamide, N-methylacrylamide, 1-methylpyrrolidone, 1-vinylpyrrolidone, pyrrolidone, ε-caprolactam, N-methyl-ε-caprolactam.

Preferred halogenated hydrocarbons and halogenated aromatic hydrocarbons useful as solvents include: chloroform, 1,1-dichloroethane, 1,2 dichloroethane, 2-chloroethanol, trichloroethylene, 1,1,1-trichloroethane, 2,2,2-trichloroethanol, o-dichlorobenzene, and 1,2,4-trichlorobenzene.

Amines useful as a dispersing solvent include: triethylamine, tripropylamine, dimethylbenzylamine, benzylamine, propylamine, allylamine, diallylamine, triallylamine, benzyldiallylamine, dimethylallylamine, morpholine, N-methylmorpholine, piperidine, isophorone diamine, ethylenediamine, diethylenetriamine, triethylene tetramine, triethylenepentamine, ethanol amine, propanolamine, diethanolamine, dipropanolamine, hexanediamine, hydrazine, piperazine and arylaliphatic diamines such as xylylenediamine and α,α,α',α'-tetramethylxylylenediamine.

Aliphatic and aromatic nitro compounds useful in a dispersing solvent medium include: nitroethane, 2-nitroethanol, and nitrobenzene.

Aliphatic and aromatic nitriles useful in a dispersing solvent medium include: benzonitrile, acetonitrile, acrylonitrile and adiponitrile.

Heteroaromatic compounds useful as solvents include: pyridine, 4-vinyl pyridine, 2-vinyl pyridine, lutidine isomers, quinoline, isoquinoline, and thiophene.

The dispersing solvent medium can be comprised of a single solvent, or, if so desired, a mixture of two or more components. Use of single solvents, depending upon the choice of solvent, may result in the formation of gels, rather than flowable slurries. Often, the use of hydrocarbon and aromatic hydrocarbon solvents results in gels being formed. The gels often can be avoided by reducing the time of the solvent milling. For instance, Example 16 illustrates that the use of xylene provides a flowable slurry after 10 minutes solvent milling but results in a gel with extended milling. Also, the gels often can be dissipated by addition of a more polar solvent such as an ether or alcohol, as illustrated in Examples 13-15.

In a preferred embodiment, the solvent is comprised of about 1 to about 30 wt % of a hydrophilic fraction characterized by greater than 5 wt % solubility in water; and about 70 to about 99 wt % of a hydrophobic fraction characterized by less than a 2 wt % solubility in water at ambient conditions. Ambient conditions, refers to the prevailing temperature and pressure of the working environment. Preferred solvents for the hydrophilic fraction are those selected from the group: aliphatic, aromatic, alicyclic and cyclic ethers and polyethers having a molecular weight of about 70 to about 2000; aliphatic, aromatic and alicyclic mono-alcohols, diols, triols, and polyols with a number average molecular weight of about 40 to about 2000 and mixtures thereof. Specific preferred solvents for the hydrophilic fraction are selected from the group: 2-propanol, 1-butanol, 2-butanol, ethylene glycol, diethylene glycol, 1,4-butane diol, 1,4 hexane diol, 1,2-propane diol, 1,3 propane diol, 2-ethoxyethanol, 2-butoxyethanol, di(ethylene glycol)methyl ether, di(ethylene glycol)ethyl ether, di(ethylene glycol) butyl ether, di(ethylene glycol)dibutyl ether, di(propylene glycol)methyl ether, and mixtures thereof.

Preferred solvents for the hydrophobic fraction are those selected from the group of aliphatic, aromatic and alicyclic hydrocarbons listed above. Preferably, about 2 to about 15 wt % of the hydrophilic fraction is used. First mixing the hydrophilic fraction with the dry-milled talc powder followed by addition and mixing of the hydrophobic fraction is a preferred process step. If so desired, the hydrophilic fraction and the hydrophobic fraction may be blended and then mixed with the dry-milled talc powder. If so desired, the hydrophobic fraction can be first mixed with the dry-milled talc powder followed by addition and mixing of the hydrophilic fraction.

In another preferred embodiment, the dispersing solvent medium can comprise one or more reactive polymerizable compounds selected from monomers, oligomers, and prepolymers. The solvent can consist essentially of reactive polymerizable compounds, for example, a nano-talc slurry wherein the solvent consist essentially of methyl methacrylate. Preferred monomers and oligomers include acrylic acid, acrylic esters, acrylamides, methacrylic acid, methacrylic esters, methyacrylamides; vinyl compounds, allylic compounds, and polyester and polyether oligomers endcapped with said acrylates and methacrylate esters; vinyl and allylic groups, and having a number average molecular weight of about 200 to about 2000. Specific preferred monomers include methyl methacrylate, methyl acrylate, ethyl acrylate, butyl methacrylate, styrene, α-methylstyrene, and divinyl benzene, bisphenol A diallylether, diallyl phthalate, 2-hydroxyethyl acrylate, 2-hydroxyethyl methacylate, 6-hydroxyhexyl acrylate, and 6-hydroxyhexyl methacylate, acrylamide, acrylonitrile, 2-vinyl pyridine, 4-vinyl pyridine, 1-vinyl pyrrolidone, and mixtures thereof.

Organic solvent dispersed nano-talc slurries of the invention can be used in a wide variety of processes to provide polymer composites. Non-reactive solvent slurries can be used in many applications wherein processing allows the dispersing solvent to be removed. Solvent dispersed nano-talc slurries can be used in the formation of composite coatings, sealing and gasketing materials including UV and thermally curable acrylate, methacrylate, epoxy, and polyurethane coatings.

Reactive, polymerizable solvent dispersed slurries can be used in many applications wherein processing allows a minimum of solvent, or no solvent, to be removed. For instance, methyl methacrylate dispersed nano-talc slurries can be used to prepare poly(methyl methacrylate) nano-talc composite resins in a bulk polymerization process. Styrene, α-methylstyrene, divinyl benzene, and styrene capped polyester oligomers, in dispersed nano-talc slurries can be used in thermosetting molding processes. Glycidyl ether based solvent nano-talc slurries and amine based slurries can be used in formation of epoxy composites for sealing, gasketing, and encapsulating composite materials.

In another preferred embodiment, the solvent can comprise one or more diols selected from the group: ethylene glycol, diethylene glycol, 1,4-butane diol, 1,4 hexane diol, 1,2-propane diol, 1,3 propane diol. Nano-talc slurries comprising these diols are especially useful in the formation of polyester nano-talc composites.

In another preferred embodiment, the solvent can comprise one of more polyols selected from the group: triethylene glycol, tetraethylene glycol, dipropylene glycol, tripropylene glycol, trimethylol propane, and higher-molecular weight compounds from the classes of polyester, polyester amide, polycarbonate, polyacetal and polyether polyols with a number average molecular weight of at least 200, preferably 500 to about 8000. Nano-talc slurries comprising these polyols are especially useful in the formation of polyurethane nano-talc composites. The polyol nano-talc dispersions can be mixed with a wide variety of polyisocyanate prepolymers and cured to give polyurethane coatings and films, molded parts, foams, and gasketing and sealing materials.

Another embodiment of the invention is a polyurethane nano-talc composite article characterized by an average platelet diameter of about 80 to 200 nm and comprising the cured reaction product of: (A) an organic solvent dispersed nano-talc slurry comprised of (a) 1 to 30 wt % nano-talc powder having a surface area of 70 $m^2/g$ to about 200 $m^2/g$; and (b) 70 to 99 wt % of an organic solvent; wherein said organic solvent is miscible with at least one organic solvent selected from the group ethyl acetate, toluene and 1,2-dichloroethane; and (B) an isocyanate terminated polyurethane prepolymer; and, optionally, (C) a polyol with a number average molecular weight of 100 to 10,000. Preferred solvents for the nano-talc slurry useful in this embodiment are selected from the group: aliphatic, aromatic and alicyclic hydrocarbons; and polyester, polyester amide, polycarbonate, polyacetal and polyether polyols with a number average molecular weight of at least 200, preferably 500 to about 8000; and mixtures thereof. Isocyanate terminated polyurethane prepolymers and polyols useful in this embodiment and methods for preparing polyurethane compositions are described in U.S. Pat. No. 6,458,880, entitled "Polyurethanes with Talc Crystallization Promoter"; U.S. Pat. No. 6,630,534, entitled Polyurethane Paste Composition and Sealing; U.S. Pat. No. 6,602,973, entitled "One Component Sealing and Coating Compounds with a Polyurethane Base; and U.S. Pat. No. 5,959,059, entitled "Thermoplastic Polyether Urethane"; all of which are hereby incorporated by reference.

Polyurethane nano-talc composite articles encompassed by the invention include, clear coats and primers for automobiles, barrier coatings for plastics, barrier coatings for steel substrates and other iron based alloys and metal substrates; polyurethane elastomers, foams, sealing and gasketing materials; and polyurethane molded parts for automobile applications such as bumpers, fenders, passenger compartment moldings, and instrument consoles.

The following examples are meant to illustrate the invention and are not meant to limit the scope of the invention.

EXAMPLE 1

This example illustrates the increase in surface area when ground talc is further treated with water in a wet milling process.

UltraTalc™ 609 talc powder (800 g, Specialty Minerals Inc., initial SSA about 17 $m^2/g$, 0.9 um average particle size) and 4.8 mm yttria-stabilized zirconia balls (16 Kg, d=5.75 g/$cm^3$) were loaded into an Union Process 1-S Attritor with stainless steel tank and shaft and mechanically milled (energy input about 0.8 KW/h) with external water cooling for 3 hours at 350 rpm to provide a powder with an SSA of 113.8 $m^2/g$). Untreated tap water (2.5 L) was added to the tank and milling continued for another 3 hours. The slurry was discharged and dried in an oven (100° C., 12 h, in air). The resulting powder has an SSA of 295.1 $m^2/g$. The particle size is an average platelet diameter of about 80 to 100 nm as determined by TEM on a sample dispersed in methanol and deposited on a carbon grid.

A 20 cm deep sample of the talc slurry separated into about 1-2 mm water and 19.8-19.9 cm talc suspension over 3 months.

EXAMPLE 2

This example illustrates the increase in surface area when ground talc is soaked in water for a period of time.

UltraTalc™ 609 talc powder (800 g Specialty Minerals Inc., initial SSA about 17 m$^2$/g, 0.9 um average particle size) and 4.8 mm-yttria stabilized zirconia balls (16 Kg) were loaded into an Union Process 1-S Attritor with stainless steel tank and shaft and mechanically milled for 3 hours at 350 rpm. During milling, the tank was cooled by cycling water to room temperature. After discharging, the SSA of the powder was 110.2 m$^2$/g. The milled powder was mixed with untreated tap water (5 parts by weight), soaked for 16 hours, and then was dried in an oven (100° C., 12 h, in air). The resulting powder had an SSA of 263.5 m$^2$/gram. The particle size was about 80 to 100 nm as determined by TEM on a sample dispersed in methanol and deposited on a carbon grid.

A 5 cm deep sample of the talc slurry separated into 3 cm water and 2 cm talc sediment over a period of about 2 h.

EXAMPLE 3 (COMPARATIVE)

This example illustrates the increase in SSA of talc with dry milling with no additional processing.

UltraTalc™ 609 talc powder (800 g) and 4.8 mm yttria stabilized zirconia balls (16 Kg) were loaded into an Union Process 1-S Attritor with stainless steel tank and shaft and mechanically milled for 6 hours at 350 rpm. During milling, the tank was cooled by cycling water to room temperature. Samples were taken for surface area analysis at 1, 2, 3, and 6 h intervals. After discharging, the maximum surface area of the powder was 123.4 m$^2$/g. Particle size was measured by TEM to be 80~120 nm. The SSA at various intervals is plotted in FIG. 1 and shows the surface area levels off at about 125 m$^2$/g.

EXAMPLE 4 (COMPARATIVE)

This example illustrates the increase in SSA of talc with wet milling (water as the medium) with no additional processing.

UltraTalc™ 609 talc powder (800 g), 14.8 mm yttria stabilized zirconia balls (16 Kg) and untreated tap water (2.5 L) was loaded into an Union Process 1-S Attritor with stainless steel tank and shaft and mechanically milled for 8 hours at 350 rpm. Samples were taken for surface area analysis at the 2, 4 and 8 h intervals. During milling, the tank was cooled by cycling water. After discharging and drying in an oven the surface area of the powder was 121.4 m$^2$/g. Particle size was measured by TEM to be about 80 to about 100 nm. The SSA at various intervals is plotted in FIG. 1 and shows the surface area levels off at about 125 m$^2$/g.

EXAMPLE 5

This example describes the hybrid milling process with a 1 hr. milling time providing the results illustrated in FIG. 2.

Talc was milled for 1 h as described in example 1 providing a powder with an SSA of 71 m$^2$/g. After adding 2.5 liters of tap water, milling was continued for another 7 hours with a sample taken at 3 hours (SSA 141.5 m$^2$/g). The slurry was discharged and dried in an oven to provide a powder with a SSA of 180.5 m$^2$/g and a particle size measured by TEM to be 120~170 nm.

EXAMPLE 6

This example describes the hybrid milling process with a 2 hr. milling time providing the results illustrated in FIG. 3.

Talc was milled for 2 h as described in example 1 providing a powder with an SSA of 103.26 m$^2$/g. After adding 2.5 liters of tap water, milling was continued for another 6 hours with a sample taken at 2 h (SSA 210.64 m$^2$/g). The slurry is discharged and dried in an oven to provide a powder with and SSA of 228.1m$^2$/g and a particle size measured by TEM to be 100~130 nm.

EXAMPLE 7

This example describes the hybrid milling process with a 3 hr. milling time providing the results illustrated in FIG. 4.

Talc was milled for 3 h as described in example 1 providing a powder with an SSA of 110.2 m$^2$/g. After adding 2.5 liters of tap water, milling was continued for another 5 hours with samples taken at 1, 2, and 3 hours (SSA 277.1, 289.2 and 295.1 m$^2$/g, respectively). The slurry was discharged and dried in an oven to provide a powder with a SSA of 331 m$^2$/g and a particle size measured by TEM to be 80~100 nm.

EXAMPLE 8

UltraTalc™ 609 talc powder (12 Kg) and 5.0 mm yttria stabilized zirconia balls (277.5 Kg) were loaded into an Union Process 30-S Szegvari Attritor with stainless steel tank and shaft and mechanically milled for 4 hours at 135 rpm (about 45 KW hours energy input) to provide a powder with an SSA of 82.4 m$^2$/g. De-ionized water (12 gallons) was added to the Attritor and milling continued for another 2 hours (about 22.5 KW hours energy input) to provide a hydrophilic nano-talc slurry (about 15 gallons) consisting of 19.6 wt % talc. A dried sample had an SSA of 199.7 m$^2$/g.

EXAMPLE 9

This example illustrates the aqueous soaking method for making high surface area nono-talc.

Ultra-Talc™ 609 talc powder was dry milled for 2.5 h as described in example 1. The SSA of the powder was 95 m$^2$/g. The milled talc was then mixed with de-ionized water (20 parts by weight) for varying amounts of time, under the following soak conditions: (1) room temperature, stirred at 1000 RPM; (2) room temperature, standing water; and (3) 90° C., standing water. Samples were drawn at 1, 2, 4, and 8 hours, and dried in an oven at 200° C. for SSA measurements. Table 1 lists the SSA results that are plotted in FIG. 5. It is evident from these that the addition of heat or mechanical energy to the soaking process increases the surface area relative to the ambient, unstirred process.

Table 1 lists the SSA for various soak methods over a period of times.

| Soak Conditions | Soak Time (hr) | Surface Area |
|---|---|---|
| 1. room temp, stirred | 1 | 305.50 |
| | 2 | 307.11 |
| | 4 | 288.13 |
| | 8 | 392.39 |
| 2. room temp, standing | 1 | 284.87 |
| | 2 | 264.76 |
| | 4 | 303.91 |
| | 8 | 309.60 |
| 3. 90 C., standing | 1 | 324.60 |
| | 2 | 317.78 |
| | 4 | 342.58 |
| | 8 | 357.41 |

EXAMPLE 10

This example illustrates the hydrophilic nature of high surface area nano-talc of the invention in comparison with commercial grade talc.

A sample of the talc slurry provided from example 1 was dried at 200° C. until no further weight loss was exhibited in a Mettler-Toledo HR83P moisture balance. The resultant material was then ground in a mortar and pestle, and re-dried in the same manner as before. The powder was allowed to cool in a vacuum desiccator, then placed on a tared balance and monitored for moisture weight gain at a relative humidity of about 49%. This was also repeated from the drying steps with unmilled UltraTalc® 609 powder. The weight gain of hybrid-milled and unmilled samples is plotted in FIG. 6 and illustrates the significantly greater moisture absorption of the hybrid-milled product of the invention.

EXAMPLE 11

This example illustrates the method of making a flowable organic solvent dispersed nano-talc slurry.

UltraTalc™ 609 talc powder (800 g) was dry milled for 3 h as described in Example 1. Toluene (3 L) and ethylene glycol butyl ether (0.4 L, glycol ether EB, Chemcentral, Pittsburgh, Pa.) were added and the mixture milled for an additional 3 h to provide a flowable nano-talc slurry (23.8 wt % based on nano-talc solids) with an SSA of 110.9 $m^2/g$. TEM analysis of the slurry showed an average platelet diameter of about 80 to 200 nm.

EXAMPLE 12

UltraTalc™ 609 talc powder (800 g) was dry milled for 3 h as described in Example 1. Ethylene glycol butyl ether (3.3 L) was added and the mixture milled for an additional 3 h to provide a flowable nano-talc slurry (22.7 wt % based on nano-talc solids) with an SSA of 119.4 $m^2/g$.

EXAMPLE 13

UltraTalc™ 609 talc powder (800 g) was dry milled for 3 h as described in Example 1. Ethylene glycol butyl ether (0.2 L) and xylene (3.3 L, mixture of isomers) were added and the mixture milled for an additional 3 h to provide a flowable nano-talc slurry (20.8 wt % based on nano-talc solids) with an SSA of 122.8 $m^2/g$.

EXAMPLE 14

UltraTalc™ 609 talc powder (800 g) was dry milled for 3 h as described in Example 1. Ethylene glycol butyl ether (0.1 L) and xylene (3.3 L) were added and the mixture milled for an additional 3 h to provide a flowable nano-talc slurry (20.5 wt % based on nano-talc solids) with an SSA of 116 $m^2/g$.

EXAMPLE 15

UltraTalc™ 609 talc powder (800 g) was dry milled for 3 h as described in Example 1. Ethylene glycol butyl ether (0.1 L) and toluene (3.3 L) were added and the mixture milled for an additional 3 h to provide a thick but flowable nano-talc slurry (26.1 wt % based on nano-talc solids) with an SSA of 145.7 $m^2/g$.

EXAMPLE 16

UltraTalc™ 609 talc powder (800 g) was dry milled for 3 h as described in Example 1. Xylene (3.3 L) was added and the mixture milled for an additional 10 min to provide a thick but flowable nano-talc slurry (22.5 wt % based on nano-talc solids) with an SSA of 104.9 $m^2/g$. Additional milling beyond 20 minutes, in this case, gave a gelled, non-flowable product. The gel can be broken with addition of ethylene glycol butyl ether, for instance, 0.1 to 0.4 L.

EXAMPLE 17

UltraTalc™ 609 talc powder (800 g) was dry milled for 3 h as described in Example 1. Methyl ethyl ketone (3.5 L) was added and the mixture milled for an additional 1 h to provide a thick but flowable nano-talc slurry (23.5 wt % based on nano-talc solids) with an SSA of 140 $m^2/g$.

EXAMPLE 18

UltraTalc™ 609 talc powder (800 g) was dry milled for 3 h as described in Example 1. n-Butyl propionate (3.3 L) and ethylene glycol butyl ether (0.2 L) were added and the mixture milled for an additional 3 h to provide a flowable nano-talc slurry (20.5 wt % based on nano-talc solids) with an SSA of 132 $m^2/g$. A similar run without addition of glycol ether EB gave a thick non-flowable paste.

EXAMPLE 19

UltraTalc™ 609 talc powder (800 g) was dry milled for 3 h as described in Example 1. Deionized water (0.2 L), ethylene glycol butyl ether (0.2 L), and xylene (3.9 L) were added and the mixture milled for an additional 3 h, to provide a thick but flowable nano-talc slurry (17.0 wt % based on nano-talc solids) with an SSA of 226 $m^2/g$.

EXAMPLE 20

UltraTalc™ 609 talc powder (800 g) was dry milled for 3 h as described in Example 1. Isopropyl alcohol (3.3 L) was added and the mixture milled for 3 h to provide a flowable nano-talc slurry (24.4 wt %) with an SSA of 123.7 $m^2/g$.

EXAMPLE 21

UltraTalc™ 609 talc powder (800 g) was dry milled for 3 h as described in Example 1. Isopropyl alcohol (0.2 L) and xylene (3.3 L) were added and the mixture milled for 3 h to provide a flowable nano-talc slurry (19 wt %) with an SSA of 139 $m^2/g$.

EXAMPLE 22 (COMPARATIVE)

This example illustrates the results of wet milling of talc powder with xylene, without the dry milling step.

UltraTalc™ 609 talc powder (800 g) was wet milled for 6 h in the presence of xylene (4.2 L) as described in Example 1. The talc slurry (20 wt %) was non-flowable, except when sheared, and had an SSA of 50 $m^2/g$. TEM analysis of the slurry showed an average platelet diameter of greater than 1 μm. Wet milling for 3 h gave a similar result.

EXAMPLE 23 (COMPARATIVE)

This example illustrates dry milling followed by mixing without wet milling.

UltraTalc™ 609 talc powder (800 g) was dry milled for 3 h as described in Example 1. A portion of the dry milled talc (80 g) was blended with ethylene glycol butyl ether (0.33 L) and allowed to sit overnight. The mixture was mixed at 25,000 rpm for 2-3 minutes with an IKA Ultra Turrax homogenizer (IKA Labortechnik) to provide a nano-talc mixture that settled into two phases within 5 minutes.

It is understood that the above-described embodiments of the invention are illustrative only and modification thereof may occur to those skilled in the art. Accordingly, it is desired that this invention is not to be limited to the embodiments disclosed herein but is to be limited only as defined by the appended claims and their legal equivalents.

What is claimed is:

1. Method of providing a flowable organic solvent dispersed nano-talc slurry with a specific surface area of 70 $m^2/g$ to about 200 $m^2/g$ comprising:

dry milling talc powder for a period of time to provide a dry-milled nano-talc powder with specific surface area of about 40 $m^2/g$ to about 130 $m^2/g$, mixing the dry-milled nano-talc powder with an amount of organic solvent to provide a nano-talc-solvent mix, and wet milling said nano-talc-solvent mix for a period of time, to provide a flowable organic solvent dispersed nano-talc slurry characterized by a specific surface area of about 70 $m^2/g$ to about 200 $m^2/g$.

2. A method of claim 1 wherein the nano-talc slurry is further characterized by an average platelet diameter of about 80 to 200 nm as determined by transmission electron microscopy.

3. A method of claim 1 wherein said organic solvent consists essentially of about 1 to about 30 wt % of a hydrophilic fraction characterized by a greater than 5 wt % solubility in water; and about 70 to about 99 wt % of a hydrophobic fraction characterized by less than a 2 wt % solubility in water at ambient conditions.

4. A method of claim 3 wherein said hydrophilic fraction consists essentially of solvent selected from the group: aliphatic, aromatic, alicyclic and cyclic ethers and polyethers having a molecular weight of about 70 to about 2000; aliphatic, aromatic and alicyclic mono-alcohols, diols, triols, and polyols with a number average molecular weight of about 40 to about 2000; and mixtures thereof.

5. A method of claim 4 wherein said hydrophilic fraction consists essentially of a solvent selected from the group: 2-propanol, 1-butanol, 2-butanol, ethylene glycol, diethylene glycol, 1,4-butane diol, 1,4 hexane diol, 1,2-propane diol, 1,3 propane diol, 2-ethoxyethanol, 2-butoxyethanol, di(ethylene glycol)methyl ether, di(ethylene glycol)ethyl ether, di(ethylene glycol)butyl ether, di(ethylene glycol) dibutyl ether, di(propylene glycol)methyl ether, and mixtures thereof.

6. A method of claim 3 wherein said hydrophobic fraction comprises a solvent selected from the group: aliphatic, aromatic and alicyclic hydrocarbons, and mixtures thereof.

7. A method of claim 6 wherein said hydrophobic fraction consists essentially of aromatic hydrocarbons selected from the group: toluene, o-, m-, and p-xylene, mesitylene, ethylbenzene, styrene, α-methylstyrene, divinyl benzene, and mixtures thereof.

8. A method of claim 1 wherein said organic solvent consists essentially of a solvent selected from the group: aliphatic, aromatic, alicyclic and cyclic ethers and polyethers having a molecular weight of about 70 to about 2000; aliphatic, aromatic and alicyclic mono-alcohols, diols, triols, and polyols with a number average molecular weight of about 40 to about 2000; and mixtures thereof.

9. A method of claim 8 wherein said organic solvent consists essentially of a solvent selected from the group: 2-propanol, 1-butanol, 2-butanol, ethylene glycol, diethylene glycol, 1,4-butane diol, 1,4 hexane diol, 1,2-propane diol, 1,3 propane diol, 2-ethoxyethanol, 2-butoxyethanol, di(ethylene glycol)methyl ether, di(ethylene glycol)ethyl ether, di(ethylene glycol)butyl ether, di(ethylene glycol) dibutyl ether, di(propylene glycol)methyl ether, and mixtures thereof.

* * * * *